INVENTOR
DONALD R. YOUNG
BY John E. Dougherty Jr.
ATTORNEY

Dec. 26, 1961 D. R. YOUNG 3,015,041

SUPERCONDUCTOR CIRCUITRY

Filed Aug. 9, 1957 3 Sheets-Sheet 3

3,015,041
Patented Dec. 26, 1961

3,015,041

SUPERCONDUCTOR CIRCUITRY

Donald R. Young, Poughkeepsie, N.Y., assignor to International Business Machines Corporation, New York, N.Y., a corporation of New York Filed Aug. 9, 1957, Ser. No. 677,239
18 Claims. (Cl. 307—88.5)

The present invention relates to cryogenic circuitry and more particularly to cryogenic amplifier circuitry employing cryotron type superconductive circuit elements.

The phenomenon of superconductivity, that is the characteristic of certain materials, when maintained below particular critical temperatures in the vicinity of absolute zero, to exhibit no measurable electrical resistance, has been known for a great many years. It has also been known that this superconductive or nonresistive state can be destroyed by applying a magnetic field of sufficient intensity to a material held at a temperature below its critical temperature. However, it was not until recently that this phenomenon began to assume any measure of importance from the standpoint of application in electrical and electronic circuitry. A number of cryogenic circuit elements, including an amplifier, are shown in the Swiss Patent 286,255 to Ericsson which patent was registered on Oct. 15, 1952, and published in Switzerland on Feb. 2, 1953. One of the more important of the recent discoveries in this field is that of the cryotron flip-flop circuit which is described in detail in an article by Dudley A. Buck which appeared in the April 1956 issue of the Proceedings of the IRE; pp. 482–493. More complete discussions of the theory of superconductivity may be found in the works of D. Shoenberg and F. London, entitled, respectively, "Superconductivity" and "Superfluids," which are cited in the above mentioned article.

The cryotron consists of a gate wire and a control coil which are maintained at a temperature at which both the coil and the gate wire are in a superconducting or a nonresistive state. The coil is made of a material which exhibits a higher threshold or critical temperature than the material of which the gate wire is made or more specifically the coil is made of a material that remains in a superconductive state in the presence of magnetic fields which are of sufficient intensity to destroy or quench superconductivity in the gate wire and cause it to assume a resistive or normal state.

The basic crytron circuit application is a flip-flop or trigger circuit which comprises two parallel current paths fed by a constant current source, with one path including the gate wire of one crytron connected in series with the control coil of a second crytron and the other path including the gate wire of the second cryotron connected in series with the control wire of the first cryotron. The two control coils are constructed of a material such that they remain superconductive at the operating temperature in the presence of the magnetic fields established by current flow through the coils and the gate wires. The magnetic field, established when the current from the source is caused to flow through one of the control coils, is sufficient to quench superconductivity in the gate wire linked by that coil. Since each gate wire is series connected to the control coil of the other cryotron, this condition, once established, maintains itself. For example, if the current from the source is initially caused to flow through the path including the gate wire of the first cryotron and the control coil of the second cryotron, the flip-flop will remain stable in this condition since the gate wire of the second cryotron is held in the normal or resistive state by the current through its control coil whereas the gate wire of the first cryotron remains superconductive since there is no current flow through its control coil. The circuit may be flipped to its other stable state by inserting resistance, which may be done, for example, using another cryotron, in the one of the paths in which current is flowing to thereby cause current to shift to the other path. After a sufficient current shift has been accomplished, the inserted resistance may be removed and the flip-flop, because of the cross coupling between gate and control wires, remains in this other stable state. Further circuit applications are possible employing cryotrons of this type and a few are described in the above-mentioned article. However, in each, the operation is essentially dependent on the same principle, that is, two or more parallel circuit paths connected to a common current source, with each path including a gate wire the resistive state of which depends upon the presence or absence of current in an associated control coil. The coils employed in these cryotrons are of constant pitch and, therefore, when energized by current flow therethrough, cause each portion of the linked gate wire to be subjected to a uniform magnetic field. The materials employed exhibit a sharp transition from superconductive to normal state when a predetermined critical field is applied and therefore the cryotrons exhibit only two states, one in which the gate wire is entirely resistive and another in which the gate wire is entirely superconductive. The devices may thus be properly termed bistable and, though they exhibit current gain, the gain cannot be increased by employing a plurality of stages of these devices. Further, since a certain minimum signal is required to switch these flip-flops, applied signals less than this minimum have no effect and the devices, therefore, are not adapted to small signal applications.

It has been suggested, though not by the one in whose behalf this application is filed, that amplification might be achieved utilizing a cryotron type device in which the control coil is wound with a varying pitch, so that, as the current through the coil is increased, successive portions of the gate wire are quenched. Such a device may, of course, be caused to exist in any one of a plurality of different states by applying different values of current to the control winding. It has been discovered by applicant that varying pitch cryotrons of this type may be connected to form push-pull type amplifiers and that a plurality of stages of these amplifiers may be interconnected with each stage increasing the current gain of the circuit.

It is, therefore, a prime object of the present invention to provide a cryogenic amplifier.

A further object is to provide a push-pull type of cryogenic amplifier.

Still another object is to provide cryogenic current amplifier circuits which can be connected in successive stages with each stage increasing the current gain of the overall circuit.

These objects have been achieved by constructing an amplifier which comprises two parallel paths each of which includes a gate wire about which is wound an associated input control coil having a varying pitch. It has been determined that varying pitch cryotrons of this type exhibit a characteristic having an appreciable range of linear amplification. When two such cryotrons are connected in parallel, as above, with a bias current applied to each control winding normally maintaining each element at an operating point on the linear portion of its characteristic, and inputs are applied in push-pull fashion, the current increase in one of the two parallel paths equals the current decrease in the other of the parallel paths. As a result the amplifier is both a constant current and constant voltage device as long as the cryotrons are operated along the linear portions of their amplification characteristics. A second stage of amplification may be added by series connecting a varying pitch control coil in each parallel path. The current through the two parallel paths of the first stage is brought together at a common terminal from which extend the two parallel paths of the second stage, each of which includes a gate wire which passes through a corresponding one of the above-mentioned coils series connected in the parallel paths of the first stage. In this way the gain is increased exponentially with the addition of successive stages. The gain of any individual stage of such an amplifier may be increased by including in each parallel path an additional varying pitch control coil which links a gate wire in the other parallel path. This type of arrangement introduces positive feedback into the circuit. By connecting the additional varying pitch coil to link a gate wire in the same path negative feedback may be achieved.

Applicant has also discovered that these above announced objects may be also achieved employing core type wound cryotrons and multiple crossing planar or thin film type cryotrons of the general type shown and described in copending application Serial No. 625,512, filed November 30, 1956, in behalf of Richard L. Garwin. In accordance with this aspect of applicant's invention, planar type amplifier cryotrons are fabricated by varying the dimensions of the control conductor at the successive points at which it crosses over the gate conductor. When current is applied to the control conductor, the magnetic field applied to the adjacent portion of the gate conductor at each crossover point varies in accordance with the dimensions of the control conductor at that point. As a result the successive portions of the gate conductor are driven resistive as current in the control conductor is increased.

Thus another object of this invention is to provide a cryogenic circuit including at least two parallel paths wherein the resistance of each path is controlled by an element effective to apply varying intensities of magnetic field to a gate conductor in that path.

A further object is to provide a thin film cryogenic amplifier.

A feature of the invention lies in the provision of a constant current; constant voltage cryogenic amplifier.

Still another object is to provide a multi-stage cryogenic circuit with a control conductor associated with each stage wherein different magnitudes of current flow through said control conductors are achieved in response to an input applied to one of said stages.

Another object is to provide a cryogenic amplifier for operating cryogenic flip-flop circuits.

Another object is to provide cryotron circuitry employing cross-coupled control conductors capable of applying different intensities of magnetic field to different portions of their associated gate conductors to thereby achieve positive feedback.

A further object is to provide cryogenic amplifier circuitry with positive feedback.

Another object is to provide a superconductor circuit of the thin film planar type including a first conductor which is arranged cross over a plurality of superconductor segments wherein the dimensions of the first conductor at the crossover points differ so that a current signal may be applied to the first conductor which is effective to drive at least one of the segments resistive but is ineffective to change the state of one or more of the other segments.

A feature of the invention lies in the provision of multistage cryogenic circuitry wherein at least one of the stages includes a pair of parallel gate conductors each of which is controlled by one of a pair of parallel control conductors connected in the preceding stage.

Another feature of the invention lies in the realization of the above mentioned objects employing either wire wound or planar cryotrons.

Other objects of the invention will be pointed out in the following description and claims and illustrated in the accompanying drawings, which disclose, by way of example, the principle of the invention and the best mode, which has been contemplated, of applying the principle.

Figure 1:
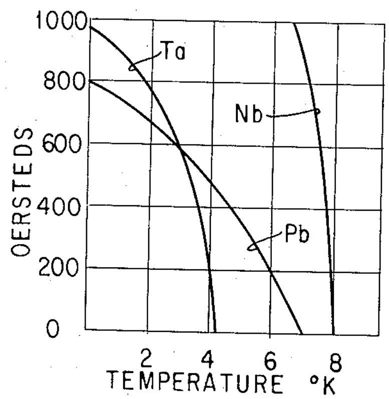
FIG. 1 is a plot of magnetic field versus temperature wherein the transitions between normal and superconductive states are illustrated for various materials.

There is shown in FIG. 1 a plot depicting the transition temperatures (T) for a plurality of materials in the presence of different values of magnetic field (H). For example, tantalum (Ta) is shown to undergo a transition from a normal to a resistive state at 4.4° K. when no magnetic field is present. This transition temperature is lowered as the magnetic field applied to the material is increased. The state of the various materials, superconductive or normal, for different temperature and field conditions is ascertained by whether or not the particular condition is represented to the left or the right of the transition curve for the material; temperature-field conditions to the left of the curve indicating a superconductive state and to the right of the curve indicating a normal state. For example, considering tantalum maintained at a temperature of 4.2° K., which is a convenient temperature since it is the boiling temperature of liquid helium at atmospheric pressure, the material is in a superconductive state as long as the magnetic field to which it may be subjected is below a threshold value shown in the plot to be about 85 oersteds. When this value of magnetic field is exceeded, superconductivity is quenched, that is, the material undergoes a transition to the normal or resistive state. From the plot it also appears that at this operating temperature there are other materials which remain in a superconductive state in the presence of a field in excess of the critical or threshold field for tantalum. Niobium (Nb) exhibits the highest threshold for the materials shown and, for the illustrative purposes of this disclosure only, and not by way of limitation, the cryotrons hereafter discussed will be considered to comprise a tantalum gate conductor and a niobium control conductor. For more complete data on various superconductive materials and on means for attaining temperatures in the vicinity of absolute zero, reference may be made to the previously cited publications.

Figure 2:
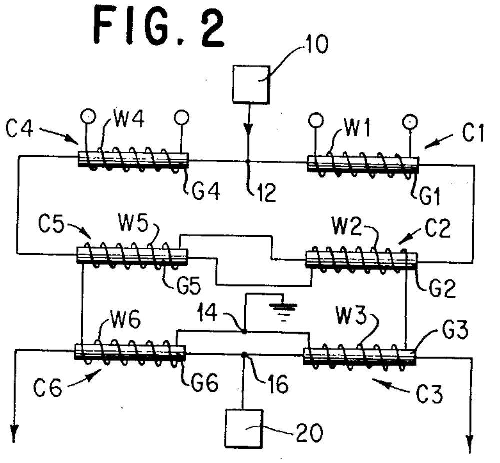
FIG. 2 is diagrammatic representation of a flip-flop circuit employing cryotrons having constant pitch control windings.

There is shown in FIG. 2 a diagrammatic representation of a flip-flop circuit employing constant pitch wire wound cryotrons arranged and operated in the manner described in the aforementioned article by Dudley A. Buck. Briefly, the operation is as follows: Current is supplied from a constant current source, illustratively represented by a box designated 10. The current from this source may flow through either of two parallel paths from a terminal 12 to another terminal 14, the latter terminal being shown connected to ground. The circuit comprises six cryotrons designated C1 through C6 and one current path includes the gates G1 and G2 of cryotrons C1 and C2 and the control coils W5 and W6 of cryotrons C5 and C6. The second path includes the gates G4 and G5 and control coils W2 and W3. Zero and one inputs to the circuit are applied to the control coils W1 and W4 of input cryotrons C1 and C4.

Assume initially that all of the current is flowing to the right from terminal 12 through the first of the parallel paths and that the current flow through windings W5 and W6 is of sufficient magnitude to cause magnetic fields in excess of their critical fields to be applied to gates G5 and G6. Since there is no current flow in coils W1 and W2 and gates G1 and G2 are, therefore, superconductive, there is no resistance in the first parallel path in which current is initially flowing and the gate G5 in the alternate parallel path is held resistive by the field established by current flow through winding W5 in the first path. The initially established condition of current flow maintains itself and the device is, therefore, stable in this state which may be designated the zero state. The circuit may be switched to the other or one state by applying to the one input winding W1 a current pulse of sufficient magnitude to cause gate G1 to become resistive. The current from source 10 then begins to divide between the two paths. When a sufficient amount of the total current has shifted from the first path, the magnetic field applied by winding W5 is decreased below the intensity necessary to maintain gate G5 resistive. All of the current then shifts from the first path and flows through the second path extending to the left from terminal 12 and through the winding W2 to thereby drive gate G2 resistive so that, upon termination of the input pulse on winding W1, the device maintains itself stably in this second or one state. The device may be flipped back to the zero state by applying a current pulse to the zero input winding W4. Outputs for the circuit may be taken by observing the direction of current flow from a current readout source 20 or the resistive state of the gates G3 and G6. When the device is in the first or zero state, current from source 10 flows through winding W6 maintaining output gate G6 resistive and therefore all the current from source 20 may be made to flow through gate G3. When the device is in the one state, gate G3 is held resistive and all the current from source 20 may be made to flow through gate G6. It should be noted that where a continuous output is allowable, the read current need not be supplied by a separate source 20 but the terminals 14 and 22 may be connected so that the current from source 10 is passed through the one of the coils W3 and W6 which is in the superconducting state.

It should be noted that in the above-described device, first disclosed in the aforementioned article by Dudley A. Buck, the cryotrons though successively connected, all exist in either one or the other of two possible states and therefore any gain realizable with one such cryotron cannot be increased by coupling it to a cryotron of the same type. Further, the inputs to windings W1 and W2 required to flip the circuit from one stable state to the other must, of themselves, be sufficient to drive the associated gate resistive and the circuit is not adapted to respond to small signals.

Up to this point only the magnetic field produced by the cryotron coils have been considered, which is a normal treatment since, when the above described device is in either of its stable states, current flows through the gate or control coil of each cryotron but not through both. However, there is a field produced by the current flow through the cryotron gates, which field is at right angles to that produced by current flow in the associated coil, and, when, during the transition from one state to the other, current flows through both the coil and gate of the same cryotron, the total field to which the gate is subjected is determined by quadrature addition of these two fields. The characteristic depicting this relationship for a constant pitch cryotron of this type is indicated by the inner ellipse designated 30 shown in FIG. 3. The ordinate in this plot is designated $i_2$ and represents current flow through the gate and the abscissa $i_1$ represents current flow through the control coil of the cryotron. The ellipse defines the transition between the superconducting and normal state for the gate; the area enclosed by the ellipse represents the superconductive state and that outside the ellipse represents the normal state. The intercept at $i_{20}$ represents the value of current through the gate which creates a self-field sufficient, of itself, to quench superconductivity in the cryotron gate. The intercept $i_{10}$ represents the value of current flow through the coil which creates a magnetic field, of itself, sufficient to quench the gate. The theoretical current gain of the device may be defined as the ratio of these two values, that is, $i_{20}/i_{10}$ and, for the cryotron whose characteristic is represented by the ellipse 30, the gain is 2.

Figure 3:
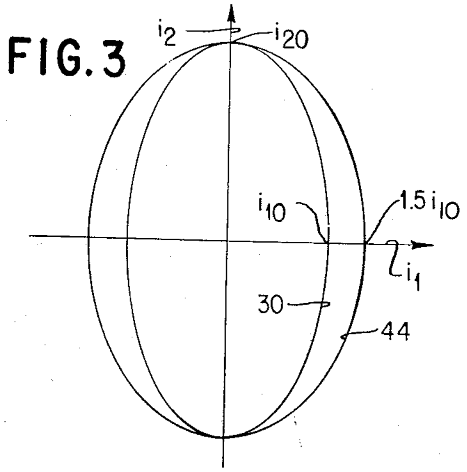
FIG. 3 is a plot of gate current versus control current illustrating the transition characteristics for cryotrons having variable pitch control windings.
Figure 4:
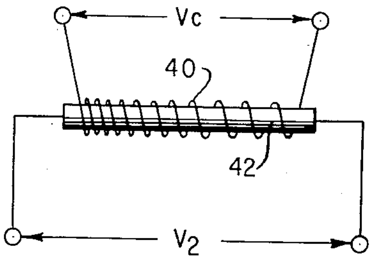
FIG. 4 is a diagrammatic representation of a variable pitch cryotron.

FIG. 4 shows a cryotron having a control coil 40 which is wound to have a varying pitch, the pitch at the left being at a minimum and increasing along the length of the coil to a maximum pitch at the right end. The intensity of the magnetic field applied to a gate 42, as the result of current flow through winding 40, is greatest at the left end where the pitch is at a minimum and decreases along the gate to a minimum at the right end where the pitch is at a maximum. The characteristics of the device are represented in FIG. 3 by the ellipse 30 and a second ellipse 44. The ellipse 30 represents the transition characteristic at the left end of the gate where the coil pitch is at a minimum and the ellipse 44 the characteristic where the coil pitch is at a maximum. Of course the value of gate current sufficient, of itself, to quench the gate is the same throughout the length of the gate and, thus, both ellipses have common intercepts with the ordinate axis for gate currents of $\pm i_{20}$. Due to the fact that the pitch of coil 40 is greatest at the right end, a greater amount of coil current $i_1$ is required to quench superconductively at the extreme right portion of the gate than is required to quench superconductively at the left end of the gate. The design here is such that a current value of $i_{10}$ amps. quenches superconductively at the left end and a current of $1.5i_{10}$ is required to quench superconductively at the right end in which case the entire length of the gate 42 is quenched. As the value of current flowing through the coil is increased between the limits $i_{10}$ to $1.5i_{10}$, an increasingly larger portion of the gate 40 is quenched. The same is true, of course, for quadrature addition of magnetic fields produced by current flow in both gate and coil. The area within the ellipse 30 is representative of the current conditions under which the entire gate 42 is superconductive; the area between the two ellipses is representative of current conditions under which portions of the gate 42 are normal and portions superconductive; and the area outside ellipse 44 represents current conditions under which the entire gate 42 is in the normal state.

Figure 5:
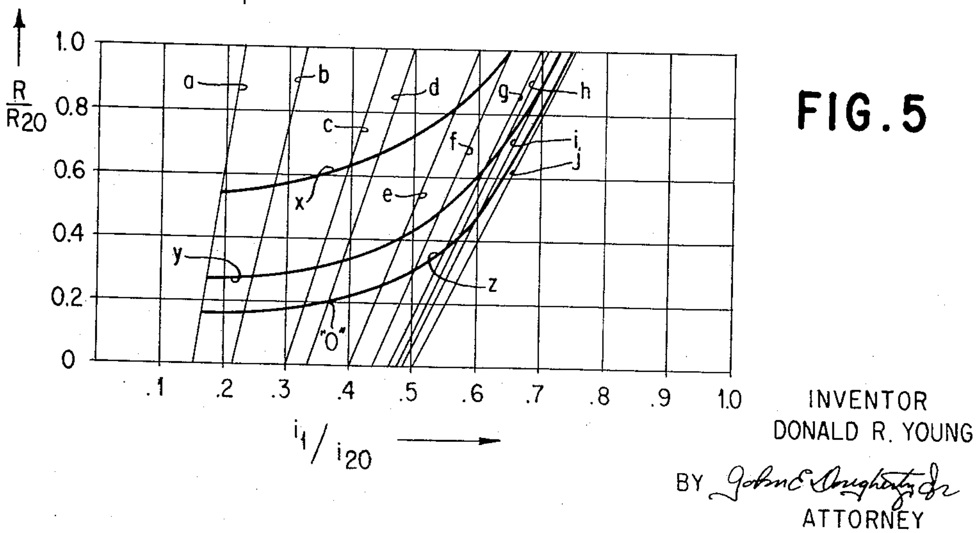
FIG. 5 is a plot depicting the relationship between the resistance, gate current and control current for the cryotron of FIG. 4.

FIG. 5 is a plot which depicts relationships between the resistance R of gate 42, the current $i_1$ in coil 40 and the current $i_2$ in the gate 42 of the variable pitch cryotron of FIG. 4. The ordinate is the resistance R of gate 42 plotted in terms of $R_{20}$, the maximum gate resistance which exists when the entire gate is in the normal state. The abscissa is the coil current $i_1$ plotted in terms of critical gate current $i_{20}$. The curves *a, b, c. d, e, f, g, h* and *j* represent the transition characteristics for values of gate current $i_2$ equal to $.95i_{20}$, $.9i_{20}$, $.8i_{20}$, $.75i_{20}$, $.6i_{20}$, $.5i_{20}$, $.4i_{20}$, $.317i_{20}$, $.025i_{20}$ and 0 respectively. The intercept of each of these curves with the abscissa represents the magnitude of coil current $i_1$, expressed in terms of gate current $i_2$, necessary with that value of coil current to begin to introduce resistance into gate 42, that is, to apply to the extreme left portion of the gate a value of field equal to the critical field. The intercepts of these curves with the horizontal line representation of the maximum resistance $R_{20}$ represent the value of coil current $i_1$ necessary, with that value of gate current, to drive the entire length of gate wire 42 resistive. For example when the gate current $i_2$ is equal to $0.8i_{20}$, a coil current $i_1$ equal to $0.3i_{20}$ is just sufficient to begin to introduce resistance in gate 42 and a coil current $i_1$ equal to $.45i_{20}$ is sufficient to cause the entire gate to assume a resistive state.

The curves designated *x*, *y* and *z* depict the relationships between the variables R, $i_1$ and $i_2$ for different values of constant voltage $V_2$ across the gate 42. The curve *x* is for a constant voltage value of $V_2$ equal to $.5i_{20}R_{20}$; the curve *y* is for a value of $V_2$ equal to $.25i_{20}R_{20}$; and the curve *z* is for a value of $V_2$ equal to $.15i_{20}R_{20}$.

Figure 6:
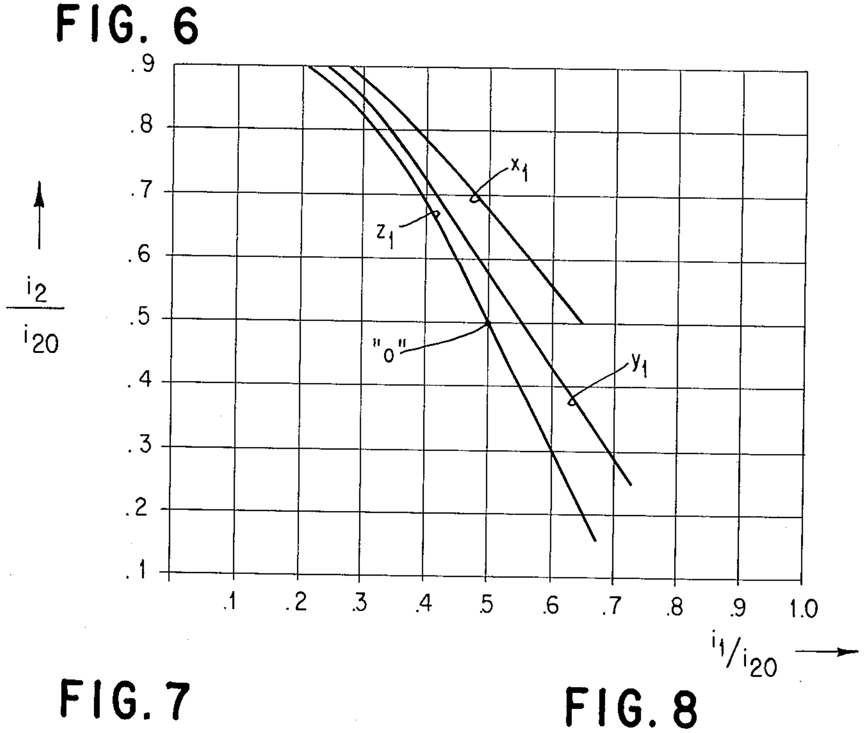
FIG. 6 is a plot of gate current versus control current wherein the gain of the cryotron of FIG. 4 for operation at different values of constant voltage is illustrated.

FIG. 6 is a plot of gate current $i_2$ versus coil current $i_1$ for the three values of constant voltage $V_2$ represented by curves *x*, *y*, and *z* of FIG. 5; the corresponding $i_2$ versus $i_1$ characteristics in FIG. 6 of $V_2$ being designated $x_1$, $y_1$, and $z_1$. Each of these curves contain a linear portion along which the cryotron may be operated as a linear amplifier. The slope along these linear portions of the three curves $x_1$, $y_1$, and $z_1$; that is the ratio of changes in current $i_2$ to changes in $i_1$, is, of course, representative of the gain of the device when operated as a linear amplifier. The gain, for a constant voltage $V_2$ equal to $.5i_{20}R_{20}$, is approximately 1.2; for $V_2$ equal to $.25i_{20}R_{20}$, the gain is approximately 1.4; and for $V_2$ equal to $.15i_{20}$, the gain is approximately 2.0.

Figures 7, 8:
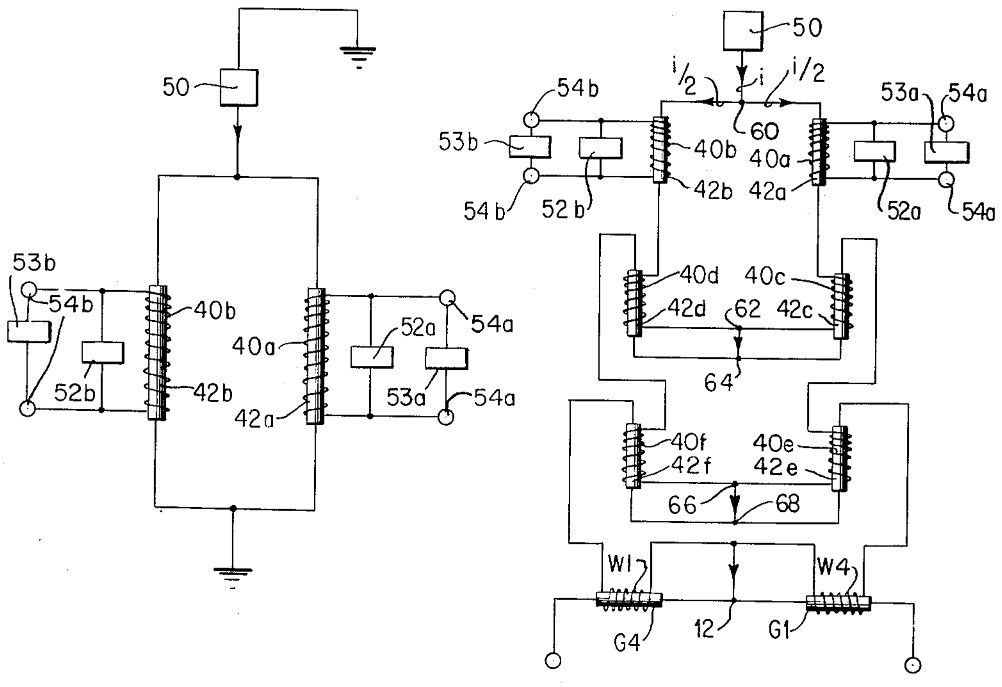
FIG. 7 is a diagrammatic representation of one embodiment of an amplifier circuit constructed in accordance with the principle of the invention.
FIG. 8 is a schematic representation of a multistage cryotron amplifier constructed in accordance with the principles of the present invention.

FIG. 7 shows a pair of variable pitch cryotrons connected in parallel circuit to which a current *i* is supplied by a source 50. Current is applied to the coils 40*a* and 40*b* of these two cryotrons from constant current sources 52*a* and 52*b*. The current supplied by each of these sources to its associated coil is equal to one-half the magnitude of the current supplied by source 50. Thus, initially the current through each of the coils 40*a* and 40*b* is equal to $i/2$ and, since the resistance of the gates 42*a*, 42*b* is thus equal, the current *i* from source 50 splits evenly and a current of $i/2$ flows through each of the gates. The current sources 50, 52*a* and 52*b* are chosen so that the current value $i/2$ is equal to $0.5i_{20}$. This initial condition or operating point is as represented at "*o*" on the curves *z* and $z_1$, of FIGS. 5 and 6, which curves represent the characteristics for a constant voltage $V_2$ equal to $0.15i_{20}R_{20}$. This operating point is located on the linear portion of the curve $z_1$ wherein the gain is, as stated above, equal to approximately 2.

Now, if, with the circuit of FIG. 7 in this condition, push-pull current inputs are applied by a pair of signal sources 53*a* and 53*b* at terminals 54*a* and 54*b*, for example, $+\Delta i$ at terminals 54*a* and $-\Delta i$ at terminals 54*b*, with $\Delta i$ being of a magnitude such that operation continues along the linear portion of characteristic curve $z_1$, the current increase in the path through gate 42*b* is equal to the current decrease through gate 42*a*, and, therefore, the voltage across the circuit remains constant. It is for this reason that a constant voltage treatment of the amplifier is here given by way of example. Under these conditions, that is, with source 50 supplying current at a constant voltage equal to $.15i_2R_{20}$ and with inputs applied in push-pull fashion to terminals 54*a*, 54*b*, it becomes apparent that the total current "*i*" remains the same, since, with coils 40*a* and 40*b* pulsed in push-pull, the current increase through the one gate 42*b* is exactly equal to the current decrease through the other gate 42*a* and the circuit is a constant voltage, constant current circuit. Source 50 may thus be a constant current source supplying a current "*i*" which is equal to 2 $(.5i_{20})$, and the operating characteristic of the cryotrons remains that of the curve $z_1$ in FIG. 6.

FIG. 8 shows the manner in which a plurality of stages of push-pull amplifiers are connected in successive stages. Each of the stages is essentially the same as the stage shown in FIG. 6 with the exception that in each stage the control coils 40 for each succeeding stage are connected in series with the gates for the preceding stage 42. The reference characters used in FIG. 7 have been applied to corresponding elements of the first stage of the amplifier of FIG. 8. A further pair of variable pitch coils 40*c* and 40*d* are connected in series with gates 42*a* and 42*b*, respectively. Initially, with current $i/2$ supplied by sources 52*a* and 52*b* maintaining gates 42*a* and 42*b* in the same resistive state, the current "*i*" supplied by source 50 splits evenly at a terminal 60 so that the current through coils 40*c* and 40*d* is also equal to $i/2$. The coils 40*c* and 40*d* form with gates 42*c* and 42*d* cryotrons which also exhibit characteristics such as are shown in FIGS. 5 and 6. The first stage of the amplifier terminates at a terminal 62, at which point the currents in the two parallel paths of this state recombine so that the total current "*i*" is again available to split in accordance with the resistance presented by the parallel paths of the second stage. Since the current through coils 40*c* and 40*d* is initially equal to $i/2$, the current will again split evenly at a terminal 64 and the current flow through gates 42*c* and 42*d* and a further pair of the same type variable pitch coils 40*e* and 40*f* is also equal to $i/2$. Coils 40*e* and 40*f* control gates 42*e* and 42*f* so that the current which combines at a terminal 66 again splits evenly at terminal 68, the input terminal for current flow through the third stage of the amplifier. With this type of arrangement each stage of the amplifier initially biases the cryotrons in the succeeding stage to the operating point "*o*" of FIGS. 5 and 6.

Connected in series with gates 42*e* and 42*f*, respectively, are a pair of constant pitch coils which are designated W4 and W1 since they may function in the same manner as the similarly designated coils shown in FIG. 2. These coils, which control associated gates G1 and G4, may be the input coils to a cryotron flip-flop circuit, the operation of which has been explained above with reference to FIG. 2. The design is such that the current $i/2$ is not sufficient to render these coils effective to drive their associated gates from the superconductive to the normal state. Thus the flip-flop, once set in either one of its stable states, is not affected by the current $i/2$ flowing through coils W1 and W2.

Inputs to the circuit are applied at terminals 54*a* and 54*b* by signal sources 53*a* and 53*b*; for example, an input of $+\Delta i$ at terminals 54*b* and of $-\Delta i$ at terminals 54*a*. As a result of such an input the current through gate 42*a* and coil 40*c* is increased from $i/2$ to a value of $i/2+g\Delta i$; where "*g*" represents the gain of the variable pitch cryotrons utilized. The current through the alternate path of the first stage, which includes gate 42*b* and coil 40*d* is decreased by a similar amount. This change in current flow through coils 40*c* and 40*d* introduces more gain since it causes the current *i* to split at terminal 64 so that a current of $i/2+g^2\Delta i$ flows through gate 42*d* and coil 40*f* and a current of $i/2-g^2\Delta i$ to flow through gate 42*c* and coil 40*e*. The gain is further increased by the cryotrons of the third stage, the current splitting at terminal 68 so that a current equal to $i/2+g^3\Delta i$ flows through gate 42*e* and the input coil W4 of the cryotron flip-flop and a current equal to $i/2-g^3\Delta i$ flows through gate 42*f* and the other input coil W1 of the cryotron flip-flop. Since the gain for the variable pitch cryotron under consideration is 2, this represents an increase in current flow through coil W4 and a corresponding decrease through coil W1 which is larger by a factor of eight than the input current pulses $\Delta i$ applied at terminals 54*a* and 54*b*. If, to exceed the threshold or critical value of magnetic field necessary to switch the input cryotrons of the flip-flop, a current greater than, for example, $i/2+4\Delta i$ is required, it becomes apparent that the amplifier circuitry allows these cryotrons to be switched with a pulse of one fourth this magnitude without the necessity of biasing the input control coils to a point where stable operation becomes exceedingly critical.

It should be apparent that the amplifier circuit need not be employed to drive a single flip-flop circuit, this being merely one of many possible applications. For example, the constant pitch cryotrons comprising coils W4 and W1 and gates G4 and G1 might be replaced by variable pitch cryotrons and the output taken by way of a voltage indication of the change in resistance in the gates of these variable pitch cryotrons as different values of current inputs are applied at terminals 54a and 54b. Further the circuit may also be employed to amplify alternating current signals applied in push-pull fashion at terminals 54a and 54b.

Outputs may also be taken from each of the stages and thereby provide an analogue to digital type converter. For example, input coils to cryotron flip-flops of the type shown in FIG. 2 may be also connected in each of the first two stages. With such an arrangement inputs of incremental magnitude are applied to terminals 54a and 54b so that an input of one increment in magnitude switches only the flip-flop connected to the third stage; an input of two increments in magnitude also switches the flip-flop connected to the second stage; and an input of three increments in magnitude switches all three cryotron flip-flops. It is, of course, obvious that as many stages of linear amplification as desired can be added by properly designing the variable pitch cryotrons and choosing proper operating points for the magnitudes of the input signals which are to be applied.

Figures 9, 10, 11:
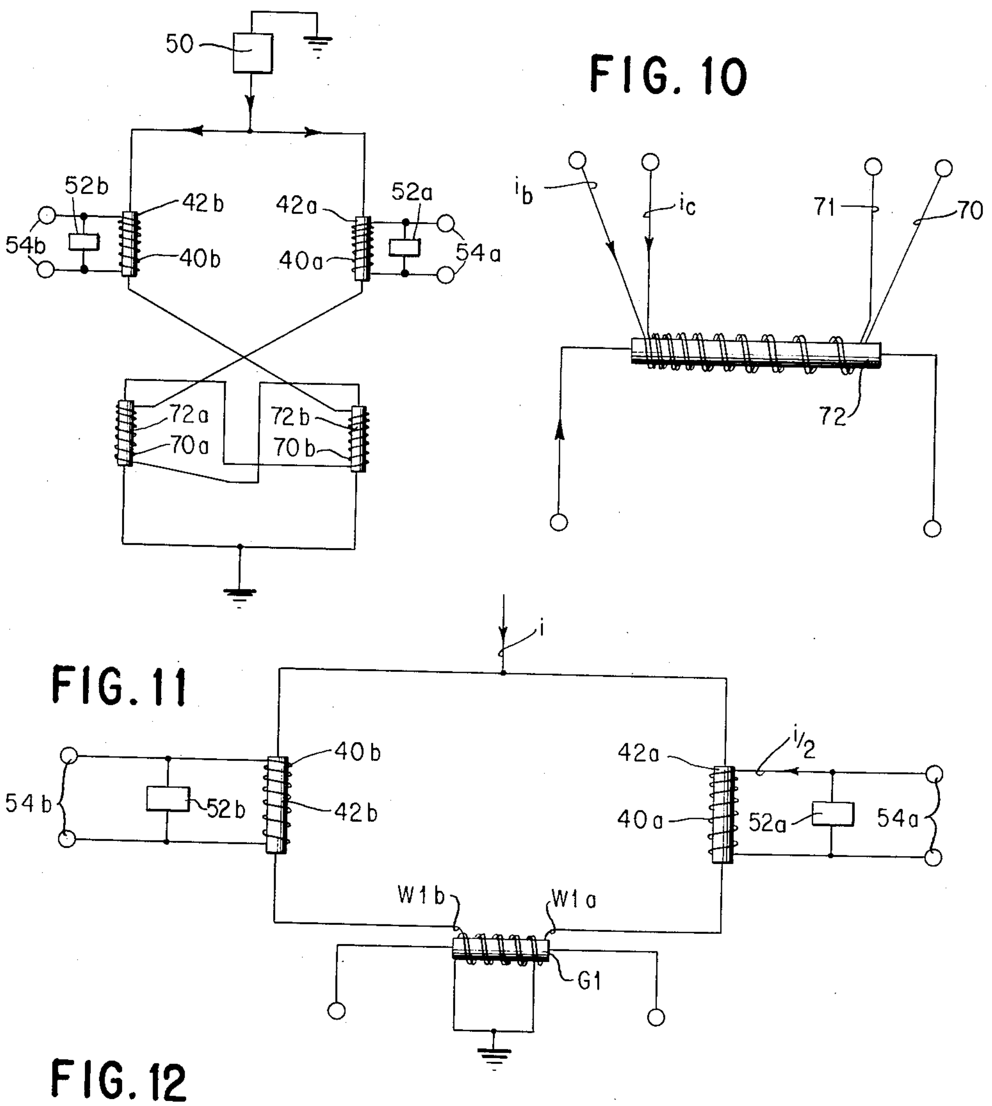
FIG. 9 is a further embodiment of an amplifier circuit constructed in accordance with the principles of the present invention.
FIG. 10 is a schematic representation of a cryotron which is provided with two varying pitch control windings.
FIG. 11 is a schematic representation of an amplifier circuit constructed in accordance with the principles of the present invention illustrating a different type output circuit arrangement.

A modification of the amplifier circuitry wherein advantage is taken of positive feedback is shown in FIG. 9. Only a single stage is here shown by way of illustration though, of course, multi-stage devices incorporating this modification and those shown in other figures, later to be described, may, of course, be constructed in the manner shown in FIG. 8. This is accomplished by adding to the circuit of FIG. 7, a pair of variable pitch cryotrons comprising coils 70a and 70b and gates 72a and 72b. These cryotrons are cross coupled with the input cryotrons, the coil 70b and gate 72a being connected in one of the parallel paths in series with gate 42b and the coil 70a and gate 72b being connected in the other parallel path in series with gate 42a. This cross coupling accomplishes the desired positive feedback or regeneration. For example, the current through gate 42a is increased by a decrease of current through coil 40a. This increased current flows through coil 70a thereby increasing the resistance of gate 72a and thus of the other parallel path. This, of course, further increasees the current flow through gate 42a. Care must be taken in the construction of the feedback cryotrons if the circuit is to operate as an amplifier to limit the amount of feedback below the amount that would render the circuit unstable.

Where extreme stability and increased operating band width are desired negative feedback may be achieved by connecting the feedback cryotrons so that gate 42a is series connected with both the coil and gate of one of the feedback cryotrons and gate 42b is series connected with both the coil and gate of the other feedback cryotron. Such an arrangement, of course, decreases the gain of the circuit.

FIG. 10 shows a cryotron which differs from that shown in FIG. 4 in that there are two windings 70 and 71 linking the gate 72. The windings 70 and 71 are of the same variable pitch as winding 40 and are adjacently wound so that the characteristics of this cryotron are the same as that of the previously described variable pitch cryotrons with the exception that the total or winding control current $i_1$ is equal to the algebraic sum of the currents $i_b$ and $i_c$. Such cryotrons may be substituted for the single cryotrons in amplifier circuitry of the present invention with, for example, the bias current source connected to the winding $i_b$ and the control signal source connected to the winding $i_c$.

A further modification wherein both the current increase in one of the parallel paths and the current decrease in the other of the parallel paths is employed advantageously is shown in FIG. 11. The basic amplifier, here shown, in that of FIG. 7, but it will be apparent as the description proceeds that the output arrangement of FIG. 11 may be employed with any of the embodiments herein described. The output of the amplifier is employed to control the resistive state of a gate element G1 which is so designated to indicate that it may be one of the input gates for a cryotron flip-flop such as is shown in FIG. 2. This gate is controlled by a pair of control windings W1*a* and W1*b* which are series connected with gates 42a and 42b, respectively. The sense of windings W1*a* and W1*b* is such that the current flow through gate 42a and thus through winding W1*a* causes a magnetic field in one direction to be applied to gate G1, whereas current flow through gate 42b and thus winding W1*b* causes a magnetic field in the opposite direction to be applied to the gate. When the amplifier is in its initial state with equal currents of $i/2$ flowing in each parallel path, the fields due to this current flow through windings W1*a* and W1*b* cancel. However, when inputs are applied in push-pull fashion at terminals 54a and 54b, the current flow through one of the output coils is increased and through the other is decreased by the same amount and thus the field applied to gate G1 is double that which would be applied if only a single one of the windings is utilized. The gain of the circuit is therefore doubled by combining the fields of output coils connected in the parallel current paths of the amplifier circuit. Where circuitry of this nature is employed to control a flip-flop such as is shown in FIG. 2, another amplifier is required to control the input to the other gate G4. This type of arrangement differs from that of FIG. 8 in that, first, the gain per stage is greater and, secondly, there is no bias field continually applied to gates G1 and G4. Upon termination of the input signals, in this as well as the other arrangements described, the amplifier assumes its initial condition with current $i/2$ flowing in each parallel path.

Figure 12:
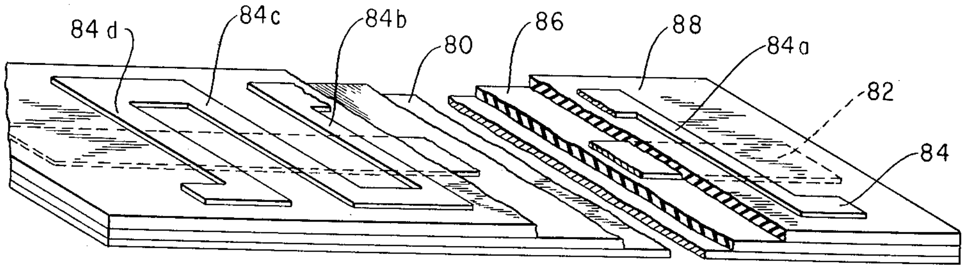
FIG. 12 shows a planar type crytron constructed in accordance with the principles of this invention and suitable for use in the novel amplifier circuitry of the invention.

Amplifiers circuitry, such as has been described above, may also be fabricated utilizing planar cryotrons similar to the type shown and described in copending application Serial No. 625,512, filed Nov. 30, 1956, in behalf of R. L. Garwin. A planar cryotron of this general type, adapted for use in the amplifier circuits such as have been previously described, is shown in FIG. 12. The device comprises a backing plate 80 on which is mounted a gate conductor or ribbon 82 and a control conductor or ribbon 84. The backing plate is separated from the gate conductor by a layer of insulating material 86 and the gate conductor is separated from the control conductor by a similar layer of insulating material 88. The device may be constructed by successively depositing thin films of the proper materials in the desired configuration. Gate current $i_2$ is applied to gate conductor 82 and control current $i_1$ to the control conductor 84 in the same manner as described above with reference to the wire wound cryotrons. Also, as before, the control conductor is fabricated of a hard superconducting material such as niobium or lead and the gate conductor of a soft superconducting material such as tantalum or tin. The magnetic fields produced by current flow in gate conductor 82 and control conductor 84 are at right angles to each other at each of the points where segments 84a, 84b, 84c and 84d of the control conductor 84 cross the gate conductor 82. These fields therefore add in quadrature and, since it is at these crossovers that the gate conductor is driven from the superconductive to the normal state, the operation is the same as for the wire wound cryotrons described above. In order to achieve a magnetic field of varying intensity, the geometry of the segments of conductor 84 is varied. For any value of current flow $i_1$ through control conductor 84, the magnetic field applied by the crossover segments 84*a*, 84*b*, 84*c* and 84*d* varies inversely with the width of these segments. In the construction shown, segment 84*a* is narrower than segment 84*b*; segment 84*b* is narrower than segment 84*c*; and segment 84*c* is narrower than segment 84*d*. As a result, the magnitude of current $i_1$, necessary to render segment 84*a* effective to drive the portion or segment of the gate conductor 82 beneath its resistive, is less than that necessary to render segment 84*b* effective to drive the associated portion or segment of gate 82 resistive, etc. The gate conductor 82 may then be cause to assume different states wherein it exhibits different values of resistance by varying the control current between the magnitude necessary to drive the portion of gate conductor 82 beneath segment 84*a* resistive and the magnitude necessary to drive the portion of gate conductor beneath segment 84*d* resistive. Though only four crossovers are illustrated it is, of course, obvious that as many crossovers of the control conductor as necessary may be provided and by varying the widths of the successive crossovers planar cryotrons, having characteristics such as are shown in FIGS. 5 and 6 or any other desired characteristics, may be fabricated and such planar cryotrons may be employed in the amplifier circuitry which has been described above in the same manner as the wire wound cryotrons such as are shown in FIGS. 4 and 10.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A superconductor device comprising a first ribbon of superconducting material maintained at a temperature at which it is superconductive in the absence of a magnetic field, a second ribbon of superconducting material arranged adjacent said first ribbon to cross the longitudinal axis of said first ribbon at a plurality of points along the length of said first ribbon, the dimensions of said second ribbon at each of said crossover points being different than the dimensions thereof at other crossover points, and means for causing current flow through said second ribbon to thereby control the resistance of said first ribbon.

2. A superconductor device comprising a first conductor of superconducting material extending in a first direction in a first plane, said first conductor being maintained at a temperature at which it is superconductive in the absence of a magnetic field, a second conductor arranged in a second plane adjacent said first plane and having a plurality of segments each arranged to extend in proximity to an associated portion of said first conductor so that current flow in said second conductor renders each of said segments effective to apply a magnetic field to a different portion of said first conductor, and means for causing current flow through said second conductor, the geometry of said second conductor being such that a greater magnitude of current in said second conductor is required to render a first one of said first segments effective to drive the associated portion of said first ribbon into a normal state than is required to render a second one of said segment effective to drive the associated portion of said first ribbon into a normal state.

3. The invention as claimed in claim 2 wherein the width of said one segment of said second conductor is greater than the width of said another segment of said conductor.

4. A superconductor device comprising a gate conductor of superconducting material maintained at a superconductive temperature, a control conductor, said control conductor comprising a plurality of segments of different dimensions each of which is arranged to traverse said gate conductor adjacent a different portion of said gate conductor.

5. A superconductor device comprising a first conductor of superconductive material maintained at a superconductive temperature, a second conductor adjacent said first conductor, means coupled to said second conductor for causing current to flow therein, said second conductor having a varying cross sectional area normal to the direction of said current flow therein so that said current flow through said second conductor is effective to cause different intensities of magnetic field to be applied to different portions of said first conductor.

6. A multi-stage amplifier circuit; each stage of said circuit comprising first and second superconductor gate conductors maintained at a superconductive temperature and connected in parallel circuit relationship, and first and second control conductors each arranged in magnetic field applying relationship to a corresponding one of said first and second gate conductors; each of said control conductors comprising a plurality of segments of different dimensions each of which traverses a different portion of the corresponding gate conductor so that increasing magnitudes of current flow between first and second limits through any one of said control conductors cause increasing portions of the corresponding gate conductor to undergo a transition from a superconductive to a normal state; one of the control conductors in each of the successive stages of said multi-stage amplifier circuit being connected in series circuit relationship with one of the gate conductors in the preceding stage and the other control conductor in each of the successive stages being connected in series circuit relationship with the other gate conductor in the preceding stage.

7. An amplifier circuit comprising first and second superconductive gate conductor means maintained at a superconductive temperature and connected in parallel circuit relationship; first and second control conductor means each arranged in magnetic field applying relationship to a corresponding one of said first and second gate conductor means; each of said control conductor means comprising a plurality of segments of different dimensions each of which traverses a different portion of the corresponding gate conductor means so that increasing magnitudes of current flow between first and second limits through each of said control conductor means cause increasing portions of the corresponding gate conductor means to undergo transitions from a superconductive to a normal state.

8. In a superconductor circuit; first and second planar segments of superconductor material maintained at a temperature at which each is superconductive in the absence of magnetic field; control conductor means comprising a planar conductor arranged to traverse said first and second segments of superconductor material at first and second locations; means for producing current in said control conductor means; the perimeter of said control conductor means normal to the direction of current flow therein being greater at the location at which it traverses said first segment than at the location it traverses said second segment, whereby a first value of current in said control conductor means is effective to drive said second segment from a superconductive to a resistive state but is ineffective to drive said first segment from a superconductive to a resistive state.

9. In a superconductor circuit; a shield of a first superconductor material; a plurality of segments of a second superconductor material; means maintaining said circuit at a superconductive operating temperature; said first superconductor material being hard relative to said second superconductor material at said operating temperature; control conductor means comprising a planar conductor arranged to traverse each of said segments of superconductor material; the width of said planar control conductor being greater at the point it traverses one of said segments than it is at the point it traverses another one of said segments.

10. A multi-stage amplifier circuit, the stages of said amplifier circuit being connected in series with a current source and each stage comprising first and second terminals and first and second parallel circuit paths extending between said terminals, each of said paths including as part thereof a gate conductor of superconducting material maintained at a superconductive temperature, means connecting the first terminal of each succeeding stage to the second terminal of the preceding stage, and a plurality of control conductors each arranged in magnetic field applying relationship to a corresponding one of corresponding gate conductors, the relationship between said control and gate conductors being such that increasing magnitudes of current flow between first and second limits through each said control conductor causes increasing portions of the corresponding gate conductor to undergo a transition from a superconductive to a normal state, at least one of the control conductors associated with one of the gate conductors in each successive stage being connected in series circuit relationship with one of the gate conductors in the preceding stage, each of said gate and control conductors being essentially planar and each said control conductor including a plurality of segments of varying dimensions each of which is arranged adjacent a different portion of said gate conductor.

11. A superconductor circuit comprising first and second gate conductors of superconductive material extending in parallel circuit relationship from a first terminal, said gate conductors being maintained at a superconducting temperature, first and second control conductors respectively associated with said first and second gate conductors for applying magnetic fields thereto, said first and second control conductors being connected in parallel circuit relationship between said first terminal and a second terminal, constant current supply means connected to said second terminal for supplying current to both said parallel connected first and second gate conductors and said parallel connected first and second control conductors, and means connected between said first and second terminals in series circuit relationship with at least one of said control conductors for continuously controlling the division of current from said current supply means at said second terminal; whereby there is continuously at least a portion of said current in each of said control conductors; said means for continuously controlling the division of current at said second terminal comprising third and fourth gate conductors of superconductive material and third and fourth control conductors respectively associated therewith, said third and fourth gate conductors comprising ribbons of superconductive material and said third and fourth control conductors comprising further ribbons of superconductive material having a plurality of segments of unequal dimensions each associated with a different portion of the associated gate conductor.

12. A multi-stage amplifier circuit including a current source, each stage of said circuit having a current gain greater than one and comprising first and second essentially planar gate conductors of superconductive material connected in parallel circuit relationship with respect to said current source and first and second essentially planar control conductors each arranged in magnetic field applying relationship to an associated one of said first and second gate conductors, said gate conductors being maintained at a temperature at which each is superconductive in the absence of a magnetic field, each of said control conductors having a varying cross sectional area normal to the direction of current therein so that increasing magnitudes of current flow between first and second limits through any one of said control conductors cause increasing portions of the associated gate conductors to undergo a transition from a superconductive to a normal state, one of the control conductors in each of the successive stages of said multi-stage amplifier circuit being connected in series circuit relationship with one of the gate conductors in the preceding stage and the other control conductor in each of the successive stages being connected in series circuit relationship with the other gate conductor in the preceding stage, whereby the gain of said multi-stage amplifier circuit is greater than the gain of any one of the individual stages thereof.

13. A multi-stage amplifier circuit, the stages of said amplifier circuit being connected in series with a current source and each stage comprising first and second terminals and first and second parallel circuit paths extending between said terminals, each of said paths including as part thereof a gate conductor of superconducting material maintained at a superconductive temperature, means connecting the first terminal of each succeeding stage to the second terminal of the preceding stage, and a plurality of control conductors each arranged in magnetic field applying relationship to a corresponding one of said gate conductors, each of said control conductors having a varying cross sectional area normal to the direction of current therein so that increasing magnitudes of current flow between first and second limits through each said control conductor cause increasing portions of the corresponding gate conductor to undergo a transition from a superconductive to a normal stage, at least one of the control conductors associated with one of the gate conductors in each successive stage being connected in series circuit relationship with one of the gate conductors in the preceding stage.

14. In a superconductor circuit; a plurality of planar superconductor conductor segments maintained at a superconductive operating temperature, and a further superconductor conductor traversing each of the conductor segments in said plurality for controlling at least one of said conductor segments in said plurality between superconductive and resistive states; the width of said further planar superconductor conductor being greater at the point it traverses one of said plurality of superconductor conductor segments than it is at the point at which it traverses another one of said plurality of superconductor conductor segments.

15. An amplifier circuit comprising a plurality of amplifier stages connected in series with a constant current source; each of said stages comprising first and second superconductor gate conductors maintained at a superconductive temperature and connected in parallel with respect to said source, and first and second control conductors each arranged in magnetic field applying relationship to a corresponding one of first and second gate conductors; the resistance of each of said gate conductors when subjected to a bias magnetic field being capable of being increased or decreased by applying appropriate current signals to the corresponding control conductor; means causing a bias magnetic field to be applied to said first and second gate conductors in said first stage and thereby causing said current from said source to divide in a predetermined manner between said gate conductors in said first stage with at least a portion of said source current in each of said gate conductors; each of the control conductors in each of the successive stages of said circuit being connected in series with a different one of the gate conductors in the preceding stage, each of said stages of said amplifier circuit of and by itself biasing the succeeding stage so that said current from said source normally divides in a predetermined manner in each of said successive stages with a portion of the source current in each gate conductor of each stage.

16. An amplifier circuit comprising a plurality of amplifier stages connected in series with a constant current source; each of said stages comprising first and second superconductor gate conductors maintained at a superconductive temperature and connected in parallel with respect to said source; and first and second control conductors each arranged in magnetic field applying relationship to a corresponding one of first and second gate conductors; the resistance of each of said gate conductors when subjected to a bias magnetic field being capable of being increased or decreased by applying appropriate current signals to the corresponding control conductor; means causing a bias magnetic field to be applied to said first and second gate conductors in said first stage and thereby causing said current from said source to divide in a predetermined manner between said gate conductors in said first stage; with at least a portion of said source current in each of said gate conductors, each of the control conductors in each of the successive stages of said circuit being connected in series with a different one of the gate conductors in the preceding stage, each of said stages of said amplifier circuit of and by itself biasing the succeeding stage so that said current from said source normally divides in a predetermined manner in each of said successive stages; and means for applying control signals to said control conductors for said first stage only to thereby cause the current in one of the gate conductors in said first stage and the series connected control conductor for the succeeding stage to increase and in the other gate conductor of said first stage and series connected control conductor for the succeeding stage to decrease by a first amount and likewise in each of said succeeding stages by increasingly greater amounts.

17. In a superconductor device; a bistable superconductor circuit including first and second gate conductors of superconductor material maintained at a superconductive temperature and connected in parallel circuit relationship with respect to a current input terminal; and means for controlling said bistable circuit to assume a first stable state with current in said first gate conductor or a second stable state with current in said second gate conductor comprising; first and second control conductors respectively associated with said first and second gate conductors for controlling the state, superconductive or resistive, of said first and second gate conductors; said first and second control conductors being connected in parallel circuit relationship with a current source; each of said first and second gate conductors being in a superconductive state when the current in the associated one of said first and second control conductors is below a predetermined threshold value and is in a resistive state when the current in the associated control conductor is above said predetermined threshold value; and means connected in series with at least one of said first and second control conductors for continuously controlling the division of current from said current source between said parallel connected first and second control conductors; said last named means controlling said current so that there is continuously at least a portion of said current in each of said control conductors and the current is increased above said threshold value selectively in said first and second control conductors to cause said bistable circuit to assume said second and first stable states.

18. The circuit of claim 17 wherein said means for continuously controlling the division of current between said first and second parallel paths includes third and fourth gate conductors of superconductor material connected respectively in said first and second parallel paths; and third and fourth control conductors each arranged adjacent a corresponding one of said third and fourth gate conductors; increasing magnitudes of current in said third and fourth control conductors between first and second limits causing increasing portions of the corresponding gate conductor to undergo a transition from a superconductive to a resistive state.

References Cited in the file of this patent

UNITED STATES PATENTS

| | | |
|---|---|---|
| 2,832,897 | Buck | Apr. 29, 1958 |
| 2,843,813 | Stammerjohn | July 15, 1958 |
| 2,935,694 | Schmitt et al. | May 3, 1960 |
| 2,936,435 | Buck | May 10, 1960 |

FOREIGN PATENTS

| | | |
|---|---|---|
| 975,848 | France | Oct. 17, 1950 |
| | Germany (Patentanmeldung W12,727 VIIIa/21a²) | Nov. 8, 1956 |

OTHER REFERENCES

Proceedings IRE, vol. 44, No. 4, April 1956, "The Cryotron—A Super-Conductive Computer Component," by D. A. Buck, pp. 482–493.

Geyger: "Magnetic-Amplifier Circuits," McGraw-Hill Pub. Co., 1954, pp. 68–70 and 180, 181, Figs. 12.5 and 12.6.